2,758,372
SCISSORS

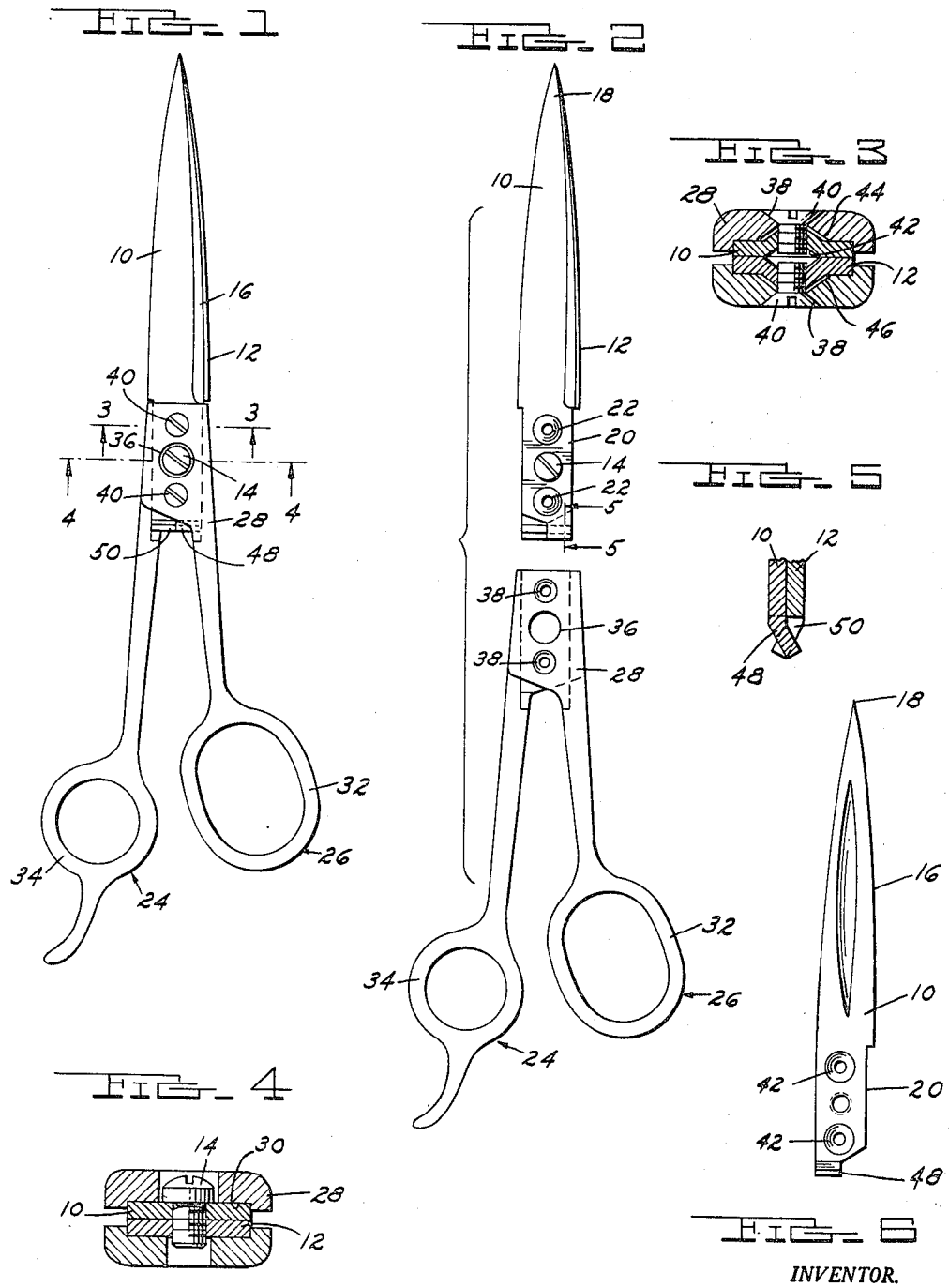

Clifford D. Gammons, Lake Worth, Fla., assignor of one-half to Elizabeth Gammons Application November 1, 1955, Serial No. 544,107

14 Claims. (Cl. 30—260)

This invention relates to scissors and is especially adapted for barber shears.

One object of the invention is to provide a pair of shears in which the blades are pivotally connected together as a unit and the handles are mounted one on each blade so that when it becomes necessary to sharpen the blades, the handles are removed while the blades remain in their connected operative relation, whereby in the course of sharpening, the blades can be adjusted to their proper operating relation even though the handles are not mounted thereon.

Another object of the invention resides in the provision of a pair of shears having pivotally connected blades, each of which is provided with a removable handle and each blade is also provided with an economically fashioned stop which limits the movement of the blades towards each other to a position wherein the finger loops on the handles are spaced apart, the stops being disposed adjacent the pivotal connection between the blades so that the user's hand and fingers are not subjected to the minor but very annoying shocks due to the impact of the finger loops against one another when the blades are repeatedly opened and closed.

It is a further object of the invention to provide a pair of shears having pivotally connected blades and detachable handles, the blades being provided with stops which can be suitably ground when the blades are resharpened to permit the blades to close to their proper overlapping relation throughout the extent of their cutting edges so that they will cut adjacent the tips of the blades after sharpening.

In the drawing:

Fig. 1 is a plan view of a pair of shears constructed in accordance with the present invention.

Fig. 2 is an exploded view of the shears showing the handles and the blade assembly in separated condition.

Fig. 3 is a sectional view along the lines 3—3 in Fig. 1.

Fig. 4 is a sectional view along the lines 4—4 in Fig. 1.

Fig. 5 is a sectional view along the lines 5—5 in Fig. 2.

Fig. 6 is a view of one of the blades as seen from the inner face thereof.

The shears of this invention comprise a pair of blades 10 and 12 which are pivotally connected together adjacent one end thereof as by a screw 14. Blades 10 and 12 are provided with cutting edges 16. Each blade is similarly shaped and when in closed position and properly adjusted, the tips 18 thereof are in overlapping relation so that the blades will cut throughout the extent of the cutting edges thereof and more particularly, adjacent the tips 18 of the blades. The blades may be very conveniently fashioned from sheet metal of high carbon or spring quality, and the body portions thereof may be stamped to the desired cross sectional shape. Adjacent the pivotal connection, the blades are formed with generally flat portions 20 through which the screw 14 extends. At the flat section 20, each of the blades is provided with a pair of threaded openings 22, one at each side of screw 14. Handle members 24 and 26 are arranged to be supported one on each blade. Each handle is provided with a shank portion 28 fashioned with a socket 30 on the inner face thereof for the reception of the flat portion 20 of one blade. At their free ends, the handles are provided with finger loops such as indicated at 32 and 34. The shank portion 28 of each handle is fashioned with three holes, a center hole 36 for accommodating the ends of screw 14 and a hole 38 at each side thereof which register with the threaded openings 22 in the blades 10 and 12. Screws 40 extend through the openings 38 and engage with the threaded openings 22 to firmly support the handles one on each of the blades. I have found that unless a very tight connection is provided between the handles and the blades, the screws 40 are apt to loosen. Thus, the arrangement must be such that the screws 40 can be tightened very substantially.

Handles 24 and 26, for purposes of economy are fashioned as castings, whereas the blades 10 and 12 must be formed of a rather high carbon steel. Thus, in view of the relative strengths of these two materials, it is preferred to arrange the screws 40 as shown so that they thread into the blades rather than into the handles. Furthermore, in order to utilize the entire thickness of the blades for engagement with the screws 40, it is preferred to fashion the metal around the threaded openings 22 as depressions or sockets on the inner faces of the blades as shown in Fig. 3. This can be effected by a simple stamping operation so that the inner faces of the blades are provided with shallow depressions 42 and the outer faces of the blades are correspondingly fashioned with circular projections 44. The handles are formed with sockets 46 about the openings 38 to accommodate these stamped projections. Thus, with this arrangement, the screws 40 may be driven entirely through the portion 20 and tightened securely without any interference to the opening and closing of the blades.

Means are provided for limiting the movement of the blades in the closing direction so that when the blades are fully closed, the tips 18 are juxtaposed, whereas the handles 24 and 26 are spaced apart. These means are fashioned as lugs 48 at the ends of the blades opposite the tips 18. Lugs 48 are bent inwardly from the plane of the blade and are provided with stop faces 50 which, when the blades are fully closed, abut one another. Lugs 48 have a dual function. In the first place, they limit the closing movement of the blades so that the finger loops are spaced apart when the blades are closed; and since these lugs are located adjacent the pivotal connection between the blades, the user's hand and fingers are not subjected to the repeated and annoying shock which they would otherwise be subjected to if the finger loops 34 contacted one another in the closed position of the blades. At the same time, the lugs 48 form a means for adjusting the blades after they are sharpened so that the tips are juxtaposed when the blades are closed. As the cutting edges 16 become worn and resharpened, the tips of the blades would normally tend to remain spaced apart with the blades fully closed. Under such circumstances, the blades would not cut adjacent the tips. However, with the present arrangement, when the blades are resharpened, if it should happen that a slight gap results between the tips of the blades, then one or both of the stop faces 50 on the lugs 48 may be ground down the desired amount to enable the blades to close in a position wherein the tips 18 are juxtaposed. Since the lugs 48 are fashioned as part of the blades themselves, it can be readily appreciated that the readjustment of the blades subsequent to sharpening can be accomplished by the person who resharpens the blades, even though the handles are not mounted on the blades.

I claim:

1. A pair of shears comprising a pair of blades pivotally connected together between their ends, said blades having cutting edges at one side of said pivotal connection and being fashioned with integral lugs on the opposite side of said pivotal connection, said lugs being arranged to abut one another in the closed position of the blades and thus limit the movement of the blades in the closing direction and a pair of handles removably mounted one on each of said blades.

2. The combination set forth in claim 1 wherein said handles are provided with finger loops at the free ends thereof, said finger loops being spaced apart out of contact in the closed position of said blades.

3. The combination set forth in claim 2 wherein said lugs are spaced closely adjacent said pivotal connection and said finger loops are remotely spaced from said pivotal connection.

4. In a pair of shears, a pair of blades each having a cutting edge adjacent one end and a projecting lug at the opposite end, means forming a pivotal connection between said blades at a point spaced intermediate said cutting edges and said lugs, said blades being movable about said pivotal connection in opposite directions to open and close, said lugs abutting one another when the blades are in closed position to limit the movement of the blades in closing direction and a handle removably mounted on each blade, said handles having finger loops at the end thereof, said lugs being disposed between said pivotal connections and said finger loops.

5. The combination set forth in claim 4 wherein said lugs are each provided with a stop face, said stop faces being disposed generally perpendicular to the plane of said blades and engaging one another to limit the movement of the blades in the closing direction.

6. The combination set forth in claim 5 wherein said lugs are designed such that said stop faces can be ground down to permit the blades to close a further extent as the cutting edges thereof become worn away.

7. A pair of shears comprising a pair of blades each having a cutting edge along one side thereof, means forming a pivotal connection between the blades so that they can be closed to a position wherein said cutting edges are in overlapping relation, said pivotal connection being disposed between said cutting edges and the opposite ends of said blades, said opposite ends each having a lug thereon provided with a portion projecting into the path of travel of the other to limit the movement of the blades in the closing direction, a pair of handles one removably connected with each blade, said handles each having a finger loop at the free end thereof, said lugs being disposed closely adjacent said pivotal connection and remotely from said finger loops.

8. The combination set forth in claim 7 wherein said lugs each form an axial extremity of the blades and being adapted to be ground down when said cutting edges are resharpened so that the blades will close throughout the extent of said cutting edges.

9. The combination set forth in claim 8 wherein said finger loops are spaced out of contact with one another when said lugs are in said abutting relation.

10. A pair of shears comprising a pair of pivotally connected blades, said blades having portions adjacent said pivotal connections which are disposed with their inner faces in face-to-face, overlapping relation when the blades are in closed position, said overlapping portions each having a threaded opening therethrough, the portions of said blades surrounding said openings forming a depression on the inner faces of the blades and a projection on the outer faces of the blades, a handle for each blade positioned against the outer face thereof, each handle having a hole therein registering with said holes in the blade and having a recess surrounding said hole at the inner face of the handle to accommodate the projection on the blade and a screw extending through said hole in the handle and threadedly engaging the hole in the blade.

11. The combination set forth in claim 10 wherein said means pivotally connecting the blades together comprises a screw extending through one of said blades and threadedly engaged with the other blade, said handles each having an opening therein for accommodating the opposite ends of said last mentioned screw.

12. The combination set forth in claim 11 wherein each handle is mounted on its respective blade by two screws disposed one at each side of said opening in the handle for accommodating the end of the screw pivotally connecting the blades.

13. The combination set forth in claim 11 wherein said blades are fashioned from sheet metal.

14. The combination set forth in claim 13 wherein the ends of said blades adjacent said handles are bent inwardly of the inner face of the blades to form lugs which abut one another when the blades are moved in the blade closing direction.

No references cited.